June 24, 1969  J. A. BOTT  3,451,602
LUGGAGE RACK
Filed June 30, 1967  Sheet 3 of 3
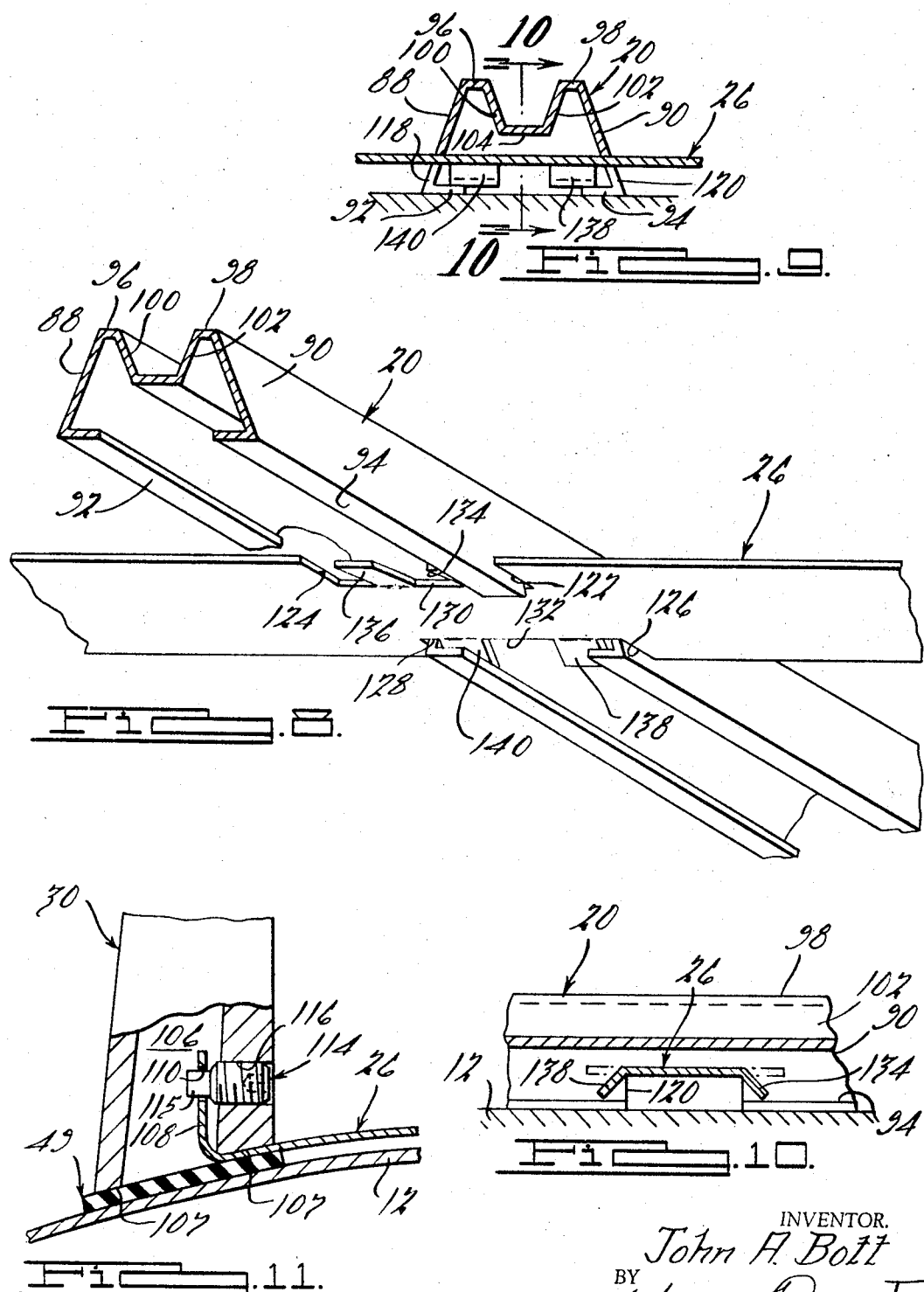
INVENTOR.
John A. Bott
BY Harness, Dickey & Pierce
ATTORNEYS

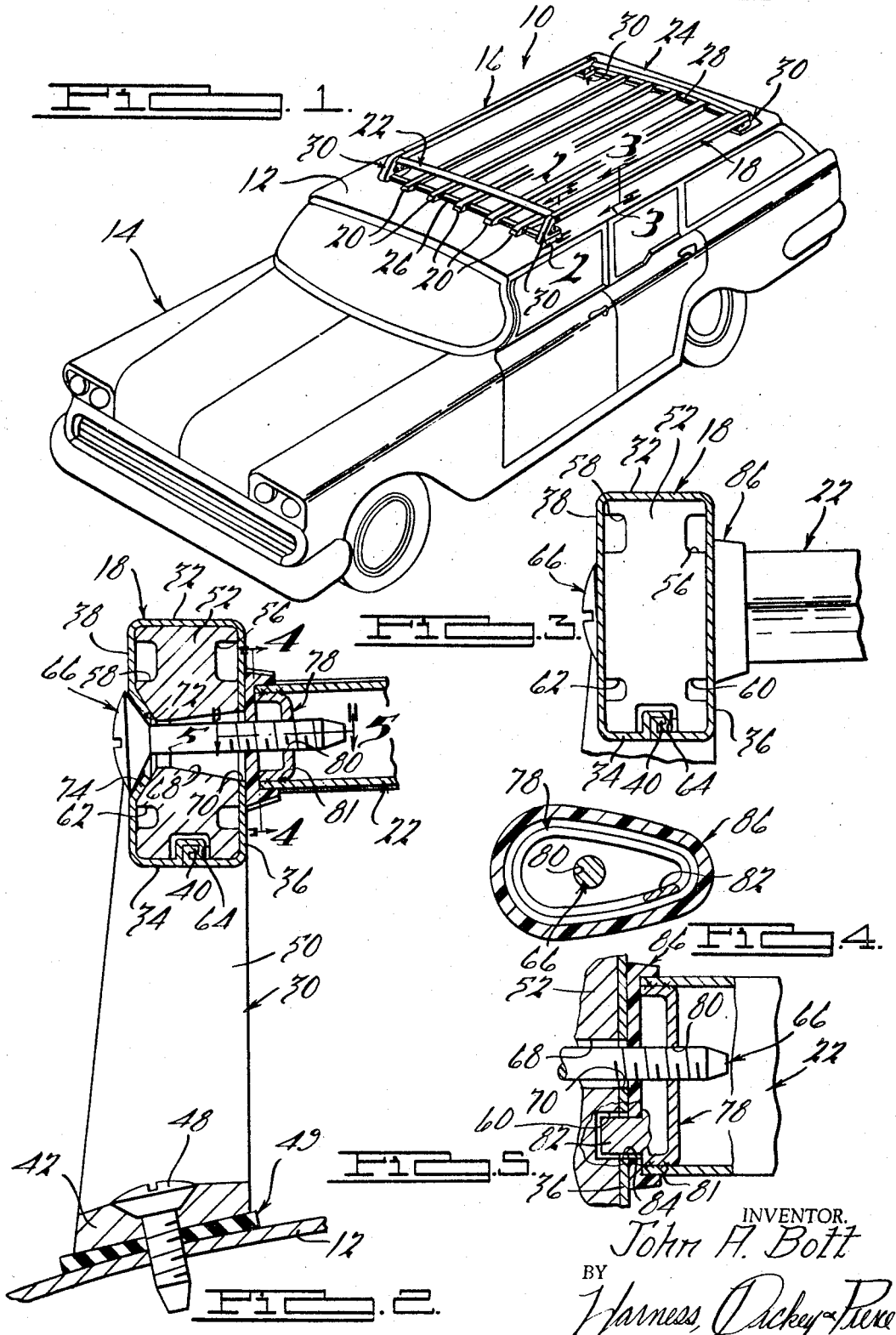

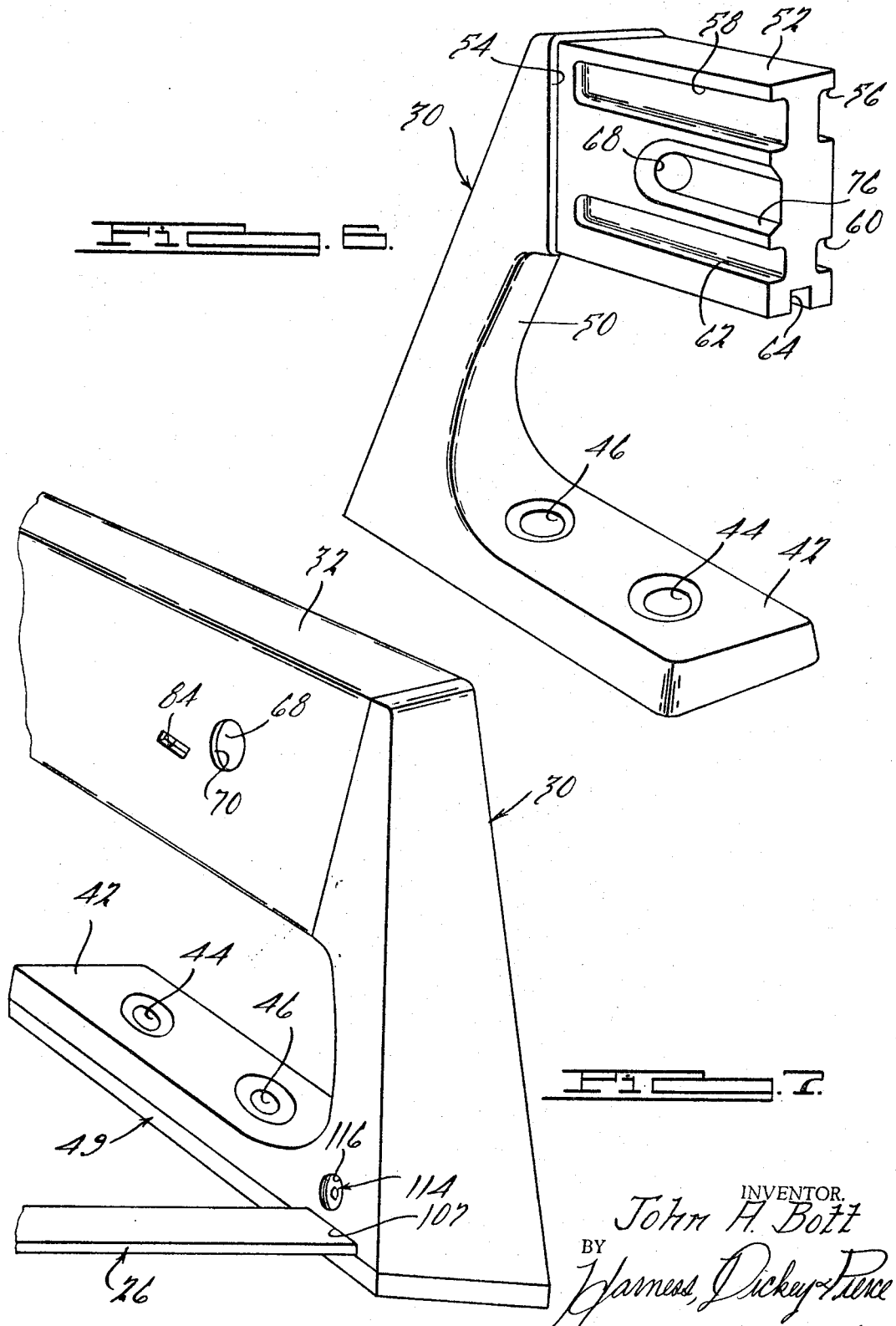

United States Patent Office 3,451,602
Patented June 24, 1969

3,451,602
LUGGAGE RACK
John A. Bott, 931 Lake Shore Drive,
Grosse Pointe Shores, Mich. 48236
Continuation-in-part of application Ser. No. 483,915,
Aug. 31, 1965. This application June 30, 1967, Ser.
No. 650,308
Int. Cl. B60r 9/04
U.S. Cl. 224—42.1
18 Claims

ABSTRACT OF THE DISCLOSURE

A rack for supporting luggage and the like on the roof portion of an automotive vehicle, the rack comprising a pair of longitudinally extending side rails; a pair of stanchion members for supporting each of the side rails, with each of the stanchion members having an upper end portion adapted for telescopic engagement with one end of one of the side rails; a pair of cross rails extending laterally between the stanchions at the forward and rearward ends of the side rails; a single fastening means disposed at each of the four corners of the rack for securing the adjacent ends of the cross rails and the side rails to the upper end portions of the stanchions, the fastening means being arranged such that the angular relation of the side rails and the stanchions relative to the cross rails may be adjusted to conform with the shape of the vehicle roof portion; a plurality of longitudinally extending luggage supporting molding strips; at least one laterally extending molding strip retaining strap for supporting the molding strips in substantially contiguous relation with the vehicle roof portion, means being provided on the inboard sides of the stanchions for engagement with the laterally outer ends of the strap for securing the same to the vehicle, and means for interconnecting the molding strips with the retaining strap including inter-engageable notched and recessed portions formed on the molding strips and retaining strap.

The purpose of the above abstract is to provide a non-legal technical statement of the disclosure of the contents of the instant patent application so as to serve as a searching-scanning tool for scientists, engineers and researchers. Accordingly, this abstract is not intended to be used in understanding the principles of the present invention hereinafter described in detail, nor is it intended to be used in interpreting or in any way limiting the scope or fair meaning of the claims appended hereto.

This application is a continuation-in-part application of the applicant's copending application for Luggage Rack, Ser. No. 483,915, filed Aug 31, 1965, now Patent No. 3,330,454.

Background of the invention

The luggage rack of the present invention employs a pair of side rails which extend longitudinally along the opposite sides of the roof of an automobile. These side rails are interconnected by means of a pair of longitudinally spaced, laterally extending cross rails which, together with the side rails are adapted to be supported upon the roof of the vehicle by means of four stanchion members located one at each corner of the rack. The side rails, cross rails and stanchions are of a construction such that they may be secured together at each of the corners of the rack by means of a single fastening member, whereby to minimize assembly time and attendant expenses with respect to comparable type luggage racks heretofore known and used. A particular feature of the above construction resides in the fact that the cross members may assume different angular relationships with respect to the stanchions in accordance with the arcuate-shape or "bow" of the vehicle roof, thereby providing for universality of installation. A plurality of laterally spaced, longitudinally extending luggage supporting molding strips are disposed within the confines of the rack and are adapted to be positioned and secured contiguously of the roof of the associated vehicle by means of a pair of mounting straps which are secured at their outer ends to the aforesaid stanchions, the fastening means for securing the straps to the stanchions being located on the inboard sides of the stanchions so as to not detract from the appearance of the rack. The molding strips are adapted to be fixedly secured to the aforesaid straps by means of a unique tab arrangement on the strips which positively preclude any relative lateral or longitudinal movement between the molding strips and retaining straps upon final assembly thereof.

Summary of the invention

This invention relates generally to means for carrying luggage and the like on automotive vehicles and, more particularly, to a new and improved luggage rack construction adapted to be operatively mounted on the roof of an automotive vehicle.

It is accordingly a general object of the present invention to provide a new and improved luggage rack construction which is of an extremely simple design and which minimizes to the extreme the requisite fastening means for operatively connecting the various component parts thereof.

It is another object of the present invention to provide a new and improved luggage rack of the above character which is constructed of standard components that may be cut to various desired lengths to accommodate luggage racks specifically designed for different vehicles, thereby minimizing the special tooling and accompanying expenses required to fabricate specific luggage racks for each type of vehicle and vehicle model.

It is still another object of the present invention to provide a new and improved luggage rack of the above character which features novel and inexpensive means for interconnecting the various components thereof without exposing the fastening means employed.

It is yet another object of the present invention to provide a new and improved luggage rack of the above character which is adapted to be mounted on vehicles having different shaped roof portions, thereby providing for universality of application.

It is still another object of the present invention to provide a new and improved luggage rack of the above character which particularly lends itself to the use of superior metals which are lightweight, corrosion resistant and pleasant in appearance.

It is still a further object of the present invention to provide a new and improved luggage rack of the above character which incorporates a plurality of luggage supporting molding strips and means in the form of a pair of retaining straps for operatively securing and positioning the molding strips, wherein the molding strips and retaining straps are positively secured in a manner so as to prevent any relative movement therebetween.

It is still another object of the present invention to provide a luggage rack of the above character which is strong, easily assembled, reasonable in cost and which is durable in construction.

Other objects and advantages of the present invention will become apparent from the following detailed description taken in conjunction with the accompanying drawings.

Brief description of the drawings

FIGURE 1 is an elevated perspective view of the luggage rack of the present invention, as shown mounted on the roof of a conventional automotive vehicle;

FIGURE 2 is a longitudinal cross sectional view of the luggage rack illustrated in FIGURE 1, as taken substantially along the line 2—2 thereof;

FIGURE 3 is a longitudinal cross sectional view of the portion of the luggage rack illustrated in FIGURE 1, as taken substantially along the line 3—3 thereof;

FIGURE 4 is a transverse cross sectional view taken substantially along the line 4—4 of FIGURE 2;

FIGURE 5 is a fragmentary cross sectional view taken substantially along the line 5—5 of FIGURE 2;

FIGURE 6 is an enlarged elevated perspective view of one of the stanchion members incorporated in the luggage rack of the present invention;

FIGURE 7 is an enlarged elevated perspective view of one of the stanchion members of the luggage rack of the present invention, as shown in operative association with one of the side rails and molding strip retaining straps incorporated in the rack of the present invention;

FIGURE 8 is a perspective view looking upwardly at one of the luggage supporting molding strips and associated retaining straps incorporated in the luggage rack of the present invention;

FIGURE 9 is a transverse cross sectional view illustrating the interconnection between the luggage supporting molding strips and retaining straps of the luggage rack of the present invention;

FIGURE 10 is a fragmentary cross sectional view taken substantially along the line 10—10 of FIGURE 9, and FIGURE 11 is an enlarged fragmentary side elevational view, partially broken away, of one of the stanchion members and retaining straps incorporated in the luggage rack of the present invention.

*Description of the preferred embodiment*

For purposes of clarity, the terms "forwardly" and "rearwardly" will have reference to the ends of the luggage rack of the present invention adjacent the forward and rearward ends of the associated automotive vehicle. Similarly, the terms "inwardly" and "outwardly" will have reference to the geometric center of the luggage rack of the present invention and to the various component parts thereof.

Referring now to FIGURE 1 of the drawings, a luggage rack 10, in accordance with a preferred embodiment of the present invention, is shown operatively mounted on a substantially flat roof portion 12 of a conventional automotive vehicle 14. The luggage rack 10 includes a pair of identical, elongated spaced parallel side rails 16 and 18 which extend longitudinally of the roof portion 12 along the opposite sides thereof. The rack 10 also includes a plurality of longitudinally extending luggage supporting molding strips, generally designated 20, and transversely or laterally extending forward and rearward cross rails 22 and 24, respectively, and molding strip retaining straps 26 and 28 which, together with the side rails 16 and 18 and cross rails 22, 24, are fixedly secured to the roof portion 12 by means of a plurality of laterally and longitudinally spaced stanchion members, generally designated 30, which are located one at each of the four corners of the rack 10.

As best illustrated in FIGURES 2 and 3, the side rails 16, 18 are preferably of a generally tubular configuration and are formed of sheet metal, for example, aluminum, which has been formed into a generally rectangular shape defining upper and lower portions 32, 34, and inboard and outboard side portions 36 and 38, respectively. In a preferred construction, each of the rails 16, 18 is formed of a single sheet of work stock having the abutting longitudinally extending edge portions thereof interconnected by means of a suitable longitudinally extending rolled locking joint formed interiorly of the lower portion 34 thereof, as indicated at 40 in FIGURES 2 and 3. With this construction, the joints 40 of the rails 16, 18 are not exposed to possibly detract from the exterior appearance of the luggage rack 10.

Referring now to FIGURES 6 and 7, the stanchions 30 are preferably identical in construction and comprise generally flat longitudinally extending base sections 42 formed with a pair of suitable counter-sunk apertures 44 and 46 adapted to receive fastening means in the form of screws, bolts or the like 48 (see FIGURE 2) for securing the same to the roof portion 12 of the vehicle 14. Suitable gasket members 49, which preferably have substantially the same conformation as the base sections 42 of the stanchions 30 and are constructed of a resilient and deformable material such as rubber or the like, are preferably provided interjacent the lower sides of each of the stanchion base sections 42 and adjacent areas of the roof portion 12 upon mounting the stanchions 30 on the automotive vehicle 14.

Each of the stanchions 30 also comprises an upwardly extending longitudinally inclined intermediate section 50 which terminates at its upper end in a longitudinally extending tongue section, generally designated 52. In a preferred construction, the sections 42, 50 and 52 of each of the stanchions 30 are preferably integral with one another, whereby the stanchions 30 may be economically fabricated, as by a molding or coating operation. As best illustrated in FIGURE 6, the tongue section 52 of the stanchions 30 is generally rectangular in transverse cross section and is of a complementary size and shape with respect to the inner periphery of the side rails 16, 18. With this arrangement, the tongue sections 52 of the stanchions 30 are adapted to be inserted into the opposite ends of the side rails 16, 18, whereby to support said rails on the roof portion 12. Preferably the upper ends of the stanchion sections 50 are slightly larger in transverse cross section than the tongue sections 52, whereby flat laterally extending shoulder portions 54 are defined around the juncture of the stanchion sections 50 and 52 against which the longitudinal ends of the side rails 16, 18 are adapted to abut upon assembly of the stanchions 30 therewith. Preferably, the shoulder portions 54 are of a size such that upon assembly of the stanchions 30 and side rails 16, 18, a smooth, pleasant appearing joint is provided at the juncture thereof, as seen in FIGURE 7.

The tongue sections 52 of the stanchions 30 are formed with a plurality of longitudinally extending recessed portions 56, 58, 60 and 62 which generally serve to minimize the weight and amount of material embodied in the tongue sections 52, with the recessed portions 60, 62 functioning in a manner later to be described to prevent rotative movement of the cross rails 22, 24. The tongue sections 52 are also formed with a longitudinally extending recessed portion 64 along the lower sides thereof which are adapted to accommodate the rolled joints 40 formed on the interior of the lower portions 34 of the side rails 16, 18 as the tongue sections 52 are inserted into the opposite ends of the side rails 16, 18. As best illustrated in FIGURES 2 and 3, the recessed portions 64 are preferably slightly larger in cross section than the rolled joints 40 to provide for interference-free assembly of the members 16, 18 and 30.

In accordance with the principles of the present invention, the stanchions 30 and ends of the side rails 16, 18 and cross rails 22, 24 at each of the four corners of the luggage rack 10 are adapted to be fixedly secured to one another by means of a single fastening member in the form of a suitable screw, bolt or similar fastening means 66. As best illustrated in FIGURES 2 and 6, each of the fastening means 66 is adapted to extend laterally inwardly of the stanchions 30 through a suitable laterally extending bore 68 formed in the tongue section 52 thereof. The forward and rearward ends of each of the side rails 16, 18 are formed with a pair of aligned openings 70 and 72 in the inboard and outboard side sections 36, 38, respectively, thereof. Upon assembly of the tongue section 52 within the ends of the rails 16, 18, the openings 70, 72 are adapted to register with the bores 68 to accommodate the fastening means 66. Preferably, the portions of the side rails 16, 18 circumjacent the opening 72 in the outboard side sections 38 thereof are countersunk or deformed inwardly, as seen at 74 in FIGURE 2, to provide for recessing, at least to some degree, of the head portion of the fastening means 66. As best seen in FIGURE 6, a longitudinally extending recessed portion 76 is formed in the outboard side of the tongue sections 52 to accommodate the inwardly deformed portions 74 of the side rails 16, 18 upon assembly thereof onto the stanchions 30.

Referring now in detail to the cross rails 22, 24 and to the manner in which they are secured to the stanchions 30, as best illustrated in FIGURES 2 through 4, the rails 22, 24 are of a generally flat eliptical configuration in transverse cross section and are preferably of a hollow tubular construction fabricated of a suitable material such as extruded aluminum. Disposed within the laterally outer ends of each of the cross rails 22, 24 is a generally cup-shaped mounting plug or insert member 78 which defines a central threaded opening 80 and is secured within the cross rails 22, 24, as by welding or the like, as indicated at 81 in FIGURE 2. Upon assembly of the luggage rack 10, the cross rails 22, 24 are adapted to be longitudinally aligned with the bores 68 of the stanchions 30, whereby the laterally inner ends of the fastening means 66 used to secure the side rails 16, 18 to the stanchions 30 may be threadably received within the openings 80 of the insert members 78 to fixedly secure the outer ends of the rails 22, 24 to the inboard sides of the stanchions 30.

As illustrated in FIGURE 5, the insert members 78 are formed with laterally outwardly extending tab sections 82 which, upon assembly of the rack 10, are adapted to be inserted through suitable complementary-shaped openings 84 in the inboard side sections 36 of the side rails 16, 18 and into the adjacent of the recessed portions 60, 62 in the tongue sections 52 of the associated stanchion 30. The tab sections 82 are intended to prevent any relative rotational movement of the cross rails 22, 24 with respect to the luggage rack 10, whereby the cross rails 22, 24 will remain in the operative positions illustrated herein once the luggage rack 10 has been finally assembled.

From the above construction, it will be seen that the ends of the side rails 16, 18 and cross rails 22, 24 are secured to the adjacent of the stanchions 30 by the single fastening means 66. Together with minimizing to the extreme the assembly time and attendant expenses in mounting the luggage rack 10 on the vehicle 14, the use of the single fastening means 66 at each of the four corners of the luggage rack 10 is designed to enhance the universality of the installation thereof. More particularly and as illustrated in FIGURE 2, it will be seen that the bores 68 in the tongue sections 52 of the stanchions 30 are tapered so as to increase in diameter toward the inboard sides of the stanchions 30. Also, the openings 70 in the inboard side portions 36 of the side rails 16, 18 are of a relatively large diameter, with the result that the innermost ends of the fastening means 66 may be pivoted substantially about the head portions thereof to a considerable degree within the bores 68. Accordingly, the cross rails 22, 24 may be positioned within some limited degree, to various angular relationships with respect to the stanchions 30 and side rails 16, 18, depending upon the curvature or "bow" of the roof portion 12 of the vehicle 14. Hence, the luggage rack 10 may be operatively mounted on the roof portions of virtually all types of vehicles and vehicle models regardless of the shapes of roof portions thereof, thus minimizing the expenses involved in designing and manufacturing a specific luggage rack for each type of vehicle.

In a preferred construction of the present invention, a generally cup-shaped gasket member 86 is preferably provided interjacent each of the laterally outer ends of the cross rails 22, 24 and the adjacent side portions 36 of the side rails 16, 18, whereby to provide a pleasant appearing joint at the juncture at the cross rails 22, 24 and the side rails 16, 18, regardless of the relative angular portions of the cross rails 22, 24 with respect to the side rails 16, 18.

Referring now in detail to the luggage supporting molding strips 20 and retaining straps 26 and 28 for securing the same on the vehicle 14, as best illustrated in FIGURE 9, it will be seen that each of the strips 20 is of a generally M-shaped configuration in transverse cross section and comprises inclined outer side sections 88 and 90 which terminate at their lower ends in laterally inwardly extending flange portions 92 and 94, respectively. The upper ends of the side sections 88, 90 terminate at laterally inwardly extending upper sections 96 and 98 adapted to have luggage and the like carried within the rack 10 supported on the upper surfaces thereof. The laterally innermost portions of the sections 96, 98 terminate in inwardly and downwardly converging sections 100 and 102 which are connected at their lower ends by an intermediate section 104. The molding strips 20 are preferably constructed of a suitable easily fabricated material which is adapted to be extruded, such as aluminum or the like.

As previously mentioned, the molding strips 20 are adapted to be secured to the luggage rack 10 by means of the pair of retaining straps 26, 28 which extend transversely between the base sections 42 of the stanchions 30 at the forward and rearward ends of the vehicle 14. As best illustrated in FIGURE 11, the laterally outer ends of the straps 26, 28 are adapted to extend through suitable complementary-shaped recesses 107 formed on the lower inboard sides of the stanchions 30 and be secured within generally hollow cavity portions 106 formed interiorly of the lower ends of the stanchions 30. More particularly, the laterally outer ends of the retaining straps 26, 28 are adapted to be bent upwardly approximately 90°, whereby to define an upwardly extending mounting section 108 on each end of each of the straps 26, 28. The mounting sections 108 are formed with central openings 110 and are adapted to be secured within the cavity portions 106 by means of a plurality of Allen or similar type lock screws 114 threadably mounted within a suitable laterally extending bore 116 formed in the inboard side of each of the stanchions 30. Each of the locking screws 114 is formed with a laterally extending boss portion 115 adapted to be inserted within the opening 110 of the associated retaining strap mounting section 108, whereby upon proper lateral outward movement of the screws 114, the mounting sections 108 will be biased laterally outwardly, thereby positively securing the ends of the straps 26, 28 within the stanchions 30. Such lateral outward force against the sections 108 of the straps 26, 28 will also function to stress the straps 26, 28 in a manner such that the intermediate portions thereof extending laterally between the stanchions 30 will be forced upwardly a predetermined amount with respect to the roof portion 12 of the vehicle 14 so that substantially even spacing between the straps 26, 28 and the roof portion 12 is maintained along the entire lengths of the straps 26, 28. It will be noted that mounting of the locking screws 114 on the inboard sides of the stanchions 30 provides for positive securing of the straps 26, 28 thereto without detracting from the exterior appearance of the luggage rack 10.

The molding strips 20 are adapted to be fixedly secured to the retaining straps 26, 28 by means of a plurality of interengageable notches or recesses formed in the members 20, 26, 28, as best illustrated in FIGURES 8 through 10. More particularly, at the intersection of each of the molding strips 20 and retaining straps 26, 28, the side sections 88, 90 of the strips 20 are formed with a pair of generally rectangular-shaped, laterally aligned recessed portions 118 and 120, respectively. At the intersection of each of the molding strips 20 and straps 26, 28, the latter members are formed with a pair of notches 122 and 124 along one side thereof and with longitudinally aligned notches 126, 128 along the opposite side thereof. The notches 122, 124, 126 and 128, together with another pair of notched portions 130 and 132, define a pair of locking tab sections 134 and 136 on one side of the straps 26, 28, and another pair of locking tab sections 138 and 140 along the opposite side of the straps 26, 28. As illustrated in FIGURE 8, the notches 122, 124 and 126, 128 are laterally spaced a distance substantially equal to the lateral spacing between the lowermost end portions of the side sections 88 and 90 of the molding strips 20, whereby the portions of the retaining straps 26, 28 having the aforesaid notches 122, 124 and 126, 128 formed therein are adapted to be nestingly received within the recessed portions 118 and 120 of the molding strips 20. After the straps 26, 28 have been thus assembled within the recessed portions 118, 120 of the molding strips 20, the locking tab sections 134, 136 and 138, 140 are designed to be deformed downwardly from the position illustrated by the dotted lines in FIGURE 10 to the position illustrated by the solid lines in this figure, whereby to lockingly secure the molding strips 20 to the retaining straps 26, 28, thus precluding any relative lateral or longitudinal movement between these members. It will be noted that the means thus described for securing the molding strips 20 to the vehicle 14 is accomplished without the use of any screws, bolts or the like interconnecting the molding strips 20 with retaining straps 26, 28, thereby minimizing assembly time and expense.

It will be seen from the foregoing description that the present invention provides a novel luggage rack construction which is of an extremely simple design and therefore economical to manufacture and easy to assemble. It will also be seen that the luggage rack of the present invention is readily adapted to be mounted on virtually all types of vehicles having different roof contours, thereby providing universality of application. Another feature of the present invention resides in the fact that the various component parts thereof are readily adapted to be connected in a manner so as to not detract from the appearance of the rack. Preferably, the various component parts of the luggage rack of the present invention are fabricated of aluminum or a similar lightweight, non-corrosive material, resulting in a luggage rack that requires relatively low cost tooling, and which has a minimum structurally accrued weight. Such a material also provides an assembly which is extremely pleasant in appearance.

I claim:

1. In a rack for supporting luggage and the like on an automotive vehicle,
a pair of longitudinally extending side rails, at least one stanchion member for supporting one end of each of said side rails,
said stanchions having upper end portions adapted for telescopic engagement with the adjacent ends of said side rails,
at least one cross rail extending laterally between said side rails and arranged generally perpendicular thereto, the laterally outer ends of said cross rail terminating adjacent the laterally inboard sides of said side rails and abuttingly engaged with said inboard sides, and
a single fastening means at each of said stanchions for securing said laterally outer ends of said cross rail and said side rails to said upper end portions of the adjacent of said stanchions.

2. The invention as set forth in claim 1 wherein said side rails have substantially hollow end portions, wherein said stanchions have longitudinally extending tongue portions insertable within said hollow end portions for supporting said side rails on a vehicle, and which includes a single fastening means for fixedly securing each of said tongue portions within one of said hollow end portions of said side rails.

3. The invention as set forth in claim 2 wherein said fastening means extend laterally inwardly of said side rails and are engageable with the laterally outer ends of said cross rails for securing the same to the inboard sides of said side rails.

4. The invention as set forth in claim 1 which includes means extending between the inboard sides of said side rails and the laterally outer ends of said cross rails for preventing rotational movement of said cross rails relative to said side rails.

5. The invention as set forth in claim 1 wherein said side rails comprise telescopic end portions, wherein said stanchions comprise mounting portions telescopically engageable with said end portions of said side rails, wherein said end portions and said mounting portions define longitudinally aligned openings, wherein said cross rails extend laterally between said side rails in substantially longitudinal alignment with said openings, and which includes single fastening means at each of said side rails extending through said openings and engageable with the laterally outer ends of the adjacent of said cross rails.

6. The invention as set forth in claim 5 which includes means on the ends of said cross rails lockingly engageable with said fastening means.

7. The invention as set forth in claim 5 wherein said cross rails include means extending laterally outwardly from the ends thereof and engageable with the inboard sides of said side rails for preventing rotational movement of said cross rails relative to said side rails.

8. The invention as set forth in claim 5 where includes gasket means interposed between the laterally outer ends of said cross rails and the inboard sides of said side rails.

9. The invention as set forth in claim 1 wherein said side rails are of a generally tubular construction of generally rectangular cross section, wherein said stanchions comprise tongue portions of substantially complementary-shaped with respect to the interior of said side rails and insertable within the ends thereof for supporting said sdie rails on a vehicle, wherein said side rails and said tongue portions have laterally extending aligned openings, wherein said across rails comprise insert members in each end thereof, and which includes a single fastening member at each of the four corners of the rack, each of said fastening members extending through said aligned openings and lockingly engaging the insert member in the end of the adjacent of said across rail.

10. In a rack for supporting luggage and the like on an automotive vehicle,
a pair of longitudinally extending side rails,
a pair of stanchions for supporting each of said side rails,
said stanchions having upper end portions adapted for telescopic engagement with the ends of said side rails,
a pair of cross rails extending laterally between said stanchions at the forward and rearward ends of said side rails, and
means for telescopically interconnecting one pair of said stanchions and said side rails with one another and for supporting the laterally outer ends of one of said cross rails at a position substantially longitudinally aligned with the interconnection between said side rails and said one pair of stanchions in a manner such that the angular relation of said side rails and stanchions relative to said cross rails may be adjusted to conform with the shape of the vehicle proof portion, said last mentioned means comprising a pivot member extending through the upper ends of said pair of stanchions and engaged with the adjacent laterally outer end of said one cross rail.

11. The invention as set forth in claim 10 wherein said side rails have substantially hollow end portions, wherein said stanchions have longitudinally extending tongue portions insertable within said hollow end portions for supporting said side rails on a vehicle, and which includes a single fastening means for fixedly securing each of said tongue portions within one of said hollow end portions of said side rails.

12. The invention as set forth in claim 10 wherein said side rails comprise telescopic end portions, wherein said stanchions comprise mounting portions telescopically engageable with said end portions of said side rails, wherein said end portions and said mounting portions define laterally aligned openings, wherein said cross rails extend laterally between said side rails in substantially longitudinally alignment with said openings, and which includse single fastening means at each end of said side rails extending through said openings and engageable with the laterally outer ends of the adjacent of said cross rails.

13. The invention as set forth in claim 12 wherein at least one of said aligned openings in said mounting portions and end portions is generally tapered, whereby said fastening means may be pivotable about one end thereof to permit said cross rails to be angularly adjusted relative to said side rails.

14. The invention as set forth in claim 10 wherein said cross rails include means extending laterally outwardly from the ends thereof and engageable with the inboard side of said side rails for preventing rotational movement of said cross rails relative to said side rails.

15. In a rack for carrying luggage and the like on an automotive vehicle,
a luggage confining structure adapted to be supported at a position spaced above a surface portion of a vehicle,
means including a pair of laterally spaced stanchions fixedly secured to said surface portion for supporting said structure in said position,
means defining a substantially recessed portion in each of said stanchions,
at least one longitudinally extending luggage supporting molding strip,
means including a molding strip retaining strap for supporting said molding strip in substantially contiguous relation with said surface portion,
said retaining strap having the outer end portions thereof turned upwardly and disposed adjacent said recessed portions of said stanchions, and
laterally extending threadably mounted means on the inboard sides of said stanchions extending through said upturned end portions for tensioning said retaining strap without deforming said upturned end portions of said retaining strap, whereby to fixedly secure said strap and said molding strip to the vehicle.

16. In a rack for carrying luggage and the like on an automotive vehicle,
a luggage confining structure adapted to be supported at a position spaced above a surface portion of a vehicle,
means including a pair of laterally spaced stanchions fixedly secured to said surface portion for supporting said structure in said position,
means defining a substantially recessed portion in each of said stanchions,
at least one longitudinally extending luggage supporting molding strip,
means including a molding strip retaining strap for supporting said molding strip in substantially contiguous relation with said surface portion,
said retaining strap having the outer end portions thereof turned upwardly and having an opening therein and disposed adjacent said recessed portions of said stanchions,
strap securing means fixedly mounted adjacent each of said recessed portions, and
fastening means extending laterally outwardly from the inboard sides of said stanchions and threadably engageable with said strap securing means, said fastening means having means thereon projecting through said openings and bearing against the inboard sides of said upturned end portions, whereby lateraly outward threadable advancement of said fastening means causes said strap to be laterally tensioned without resulting in said upturned end portions thereof being bent outwardly relative to the main body of the strap.

17. In a rack for supporting luggage and the like on an automotive vehicle,
a pair of longitudinally extending side rails,
at least one stanchion member for supporting one end of each of said side rails,
said stanchion members having upper end portions adapted for telescopic engagement with the adjacent ends of said side rails,
at least one cross rail extending laterally between said side rails and disposed adjacent said stanchion members, and
a single fastening means at each of said stanchions for securing the adjacent ends of said cross rail and said side rails to said upper end portions of the adjacent of said stanchions, said fastening means extending laterally through said side rails, the upper ends of said stanchion members, and being fixedly secured within the laterally outer ends of said cross rail.

18. In a rack for carrying luggage and the like on an automotive vehicle,
a luggage confining structure adapted to be supported at a position spaced above a surface portion of a vehicle,
means including a pair of laterally spaced stanchions fixedly secured to said surface portion for supporting said structure in said position,
means defining a substantially hollow portion in each of said stanchions,
at least one longitudinally extending luggage supporting molding strip,
means including a molding strip retaining strap for supporting said molding strip in substantially contiguous relation with said surface portion,
said retaining strap having the outer end portions thereof turned upwardly and having an opening therein and disposed within said hollow portions of said stanchions, and
screw means extending laterally outwardly from the inboard sides of said stanchions, said screw means including boss means projecting outwardly through said openings in said upturned end portions of said strap, whereby laterally outward movement of said screw means effects tensioning of said strap and thereby secures the laterally outer ends of said strap to said stanchions.

References Cited

UNITED STATES PATENTS

| | | | |
|---|---|---|---|
| 3,132,780 | 5/1964 | Binding | 224—42.1 |
| 3,174,665 | 3/1965 | Williams | 224—42.1 |
| 3,325,067 | 6/1967 | Helm | 224—42.1 |
| 2,596,860 | 5/1952 | McCrory et al. | 224—42.1 |
| 2,919,841 | 1/1960 | Helm | 224—42.1 |
| 3,061,256 | 10/1962 | Feinstein et al. | 224—42.1 |
| 3,171,578 | 3/1965 | Genthe | 224—42.1 |
| 3,223,301 | 12/1965 | Helm | 224—42.1 |
| 3,325,068 | 6/1967 | Helm | 224—42.1 |

FOREIGN PATENTS

| | | |
|---|---|---|
| 1,061,457 | 12/1953 | France. |

GERALD M. FORLENZA, *Primary Examiner.*

F. E. WERNER, *Assistant Examiner.*